US008410436B2

(12) United States Patent
Mukaibatake et al.

(10) Patent No.: US 8,410,436 B2
(45) Date of Patent: Apr. 2, 2013

(54) QUADRUPOLE MASS SPECTROMETER

(75) Inventors: Kazuo Mukaibatake, Kyoto (JP); Shigenobu Nakano, Kyoto (JP); Minoru Fujimoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 235 days.

(21) Appl. No.: 12/952,104

(22) Filed: Nov. 22, 2010

(65) Prior Publication Data

US 2011/0073756 A1 Mar. 31, 2011

Related U.S. Application Data

(62) Division of application No. 12/994,019, filed as application No. PCT/JP2008/001307 on May 26, 2008.

(51) Int. Cl.
*B01D 59/44* (2006.01)

(52) U.S. Cl. ......................... 250/290; 250/288; 250/292

(58) Field of Classification Search ................... 250/290
See application file for complete search history.

(56) References Cited

U.S. PATENT DOCUMENTS 4,761,545 A * 8/1988 Marshall et al. .............. 250/291
5,696,376 A * 12/1997 Doroshenko et al. .......... 250/292
5,847,386 A * 12/1998 Thomson et al. ............. 250/288
6,285,027 B1 * 9/2001 Chernushevich et al. ..... 250/287
6,762,404 B2 * 7/2004 Bateman et al. .............. 250/281
2002/0005480 A1 1/2002 Harada
2006/0016985 A1 1/2006 Roushall et al.
2006/0261266 A1 * 11/2006 McCauley ..................... 250/287
2007/0114374 A1 5/2007 Prest et al.
2010/0193684 A1 8/2010 Mukaibatake et al.

FOREIGN PATENT DOCUMENTS

GB 1484742 A 9/1977
JP 63-072057 4/1988
JP 04-289652 10/1992
JP 08-077964 3/1996
JP 11-162400 6/1999
JP 2000-195464 7/2000
JP 2005-259616 9/2005
WO 2007083403 A1 7/2007

OTHER PUBLICATIONS

Translation of International Preliminary Report on Patentability and Written Opinion of the International Searching Authority.

(Continued)

*Primary Examiner* — Phillip A Johnston
(74) *Attorney, Agent, or Firm* — DLA Piper LLP (US)

(57) ABSTRACT

In a scan measurement in which a mass scan is repeated across a predetermined mass range, when a voltage is returned from a termination voltage of one scan to an initiation voltage for the next scan, an undershoot or other drawbacks occur to destabilize the voltage value. Therefore, an appropriate waiting time is required. Conventionally, this waiting time has been set to be constant regardless of the analysis conditions. On the other hand, in the quadrupole mass spectrometer according to the present invention, the mass difference ΔM between the scan termination mass and the scan initiation mass is computed based on the specified mass range, and a different settling time is set in accordance with this mass difference. When the mass difference ΔM is small and hence requires only a short voltage stabilization time, a relatively short settling time is set. This shortens the cycle period of the mass scan, which increases the temporal resolution.

8 Claims, 4 Drawing Sheets

OTHER PUBLICATIONS

Chinese language office action dated Apr. 28, 2012 and its English language translation issued in corresponding Chinese application 200880129479.1.

Extended European search report dated Dec. 6, 2011 for corresponding European application 10195573.0.

Extended European search report dated Dec. 6, 2011 for corresponding European application 08763907.6.

European office action dated Sep. 14, 2012 issued in corresponding European application 10195573.0.

* cited by examiner

QUADRUPOLE MASS SPECTROMETER

CROSS-REFERENCE TO THE RELATED APPLICATIONS

This application is a divisional of application Ser. No. 12/994,019, filed on Nov. 22, 2010, which is a national stage of international application No. PCT/JP2008/001307, filed on May 26, 2008, the entire contents of which are incorporated herein by reference.

TECHNICAL FIELD

The present invention relates to a quadrupole mass spectrometer using a quadrupole mass filter as a mass separator for separating ions in accordance with their mass (or m/z, to be exact).

BACKGROUND ART

A quadrupole mass spectrometer using a quadrupole mass filter in a mass separator for separating ions in accordance with their mass-to-charge ratio has been known as a type of mass spectrometer. FIG. 6 is a schematic configuration diagram of a general quadrupole mass spectrometer.

A sample molecule is ionized in an ion source 1. The generated ions are converged (and simultaneously accelerated in some cases) by an ion transport optical system 2, such as an ion lens, and injected into a longitudinal space of a quadrupole mass filter 3. The quadrupole mass filter 3 is composed of four rod electrodes (only two electrodes are shown in FIG. 6) arranged in parallel around an ion optical axis C. A voltage of ±(U+V·cos ωt) is applied to each of the rod electrodes, in which a direct-current voltage ±U and a radio-frequency voltage ±V·cos ωt are added. In accordance with this application voltage, only an ion or ions having a specific mass selectively pass through the longitudinal space, while the other ions are dispersed along the way. A detector 4 provides electric signals in accordance with the amount of ions which have passed through the quadrupole mass filter 3.

As just described, the mass of the ions which pass through the quadrupole mass filter 3 changes in accordance with the voltage applied to the rod electrodes. Therefore, by varying this application voltage, the mass of the ions that arrive at the detector 4 can be scanned across a given mass range. This is the scan measurement in a quadrupole mass spectrometer. For example, in a gas chromatograph mass spectrometer (GC/MS) and a liquid chromatograph mass spectrometer (LC/MS), sample components injected into the mass spectrometer change as time progresses. In such a case, by repeating the scan measurement, a variety of components which sequentially appear can be almost continuously detected. FIG. 7 is a diagram schematically illustrating the change in the mass of the ions which arrive at the detector 4.

In such a scan measurement, the voltage applied to the rod electrodes is gradually increased from a voltage corresponding to the smallest mass M1, and when the voltage reaches a voltage corresponding to the largest mass M2, the voltage is immediately returned to the voltage corresponding to the smallest mass M1. Since such a rapid change in the voltage inevitably causes an overshoot (undershoot), a waiting time (settling time) is needed for allowing the voltage to stabilize after the change.

For example, Patent Document 1 discloses that it is inevitable to provide a settling time in a selected ion monitoring (SIM) measurement, and this is also true for the scan measurement. Hence, as shown in FIG. 7, a settling time is provided for every mass scan. During this settling time, a mass analysis of a component injected into the ion source 1 is not performed. Therefore, the longer the settling time is, the longer the time interval is between the mass scans, i.e. the longer the cycle of the mass scan is, which decreases the temporal resolution.

In general, when a mass range that a user wants to monitor (M1 through M2 in the example of FIG. 7) is specified in a mass spectrometer, a mass spectrum for the range is created. However, as an internal operation of the spectrometer, a mass scan is performed across a mass range extended above and below the specified mass range by a predetermined width. That is, even when a mass range of M1 through M2 is specified, a mass scan is performed in which M1−ΔM1 is the initiation point of the mass scan and M2+ΔM2 is the end point thereof. This is because it takes time for the first target ion to be ejected from the quadrupole mass filter after it is injected thereinto; during this period of time, an undesired ion or ions which have previously remained inside the mass quadrupole filter 3 reach the detector 4, which impedes an acquisition of an accurate signal intensity. To take an example, in the case where a mass range to be observed is m/z 100 through 1000, a scan is performed across the mass range of m/z 90 through 1010 with a scan margin of m/z 10 both above and below the mass range to be observed.

The time period of such a scan margin for stably performing a measurement, which is provided outside the mass range necessary for creating a mass spectrum, does not substantially contribute to the mass analysis, just like the settling time. Therefore, in order to increase the temporal resolution of an analysis, it is preferable that the scan margin width is also as small as possible.

[Patent Document 1] Japanese Unexamined Patent Application Publication No.

DISCLOSURE OF THE INVENTION

Problem to be Solved by the Invention

The present invention has been developed to solve the aforementioned problems and the main objective thereof is to provide a quadrupole mass spectrometer capable of increasing the temporal resolution, when a mass scan across a predetermined mass range is repeated or a process in which a predetermined plurality of masses are sequentially set is repeated, by shortening the time which does not substantially contribute to the mass analysis as much as possible to shorten the cycle period.

Means for Solving the Problem

To solve the previously described problem, the first aspect of the present invention provides a quadrupole mass spectrometer which includes a quadrupole mass filter for selectively allowing an ion having a specific mass to pass through and a detector for detecting the ion which has passed through the quadrupole mass filter and which performs a scan measurement in which a cycle of scanning the mass of ions which pass through the quadrupole mass filter across a predetermined mass range is repeated or a measurement in which a cycle of sequentially setting a plurality of masses is repeated, the quadrupole mass spectrometer including:

a) a quadrupole driver for applying a predetermined voltage to each of electrodes composing the quadrupole mass filter; and b) a controller for controlling the quadrupole driver in such a manner as to change the voltage applied to each of the electrodes composing the quadrupole mass filter in accordance with the mass during the scan measurement or the measurement in which a cycle of sequentially setting a plurality of masses is repeated, while changing the waiting time from the termination of one cycle to the initiation of the subsequent cycle in accordance with the mass difference between the initiation mass and the termination mass in a cycle.

In this invention, the measurement in which a cycle of sequentially setting a plurality of masses is repeated may be, for example, a selected ion monitoring (SIM) measurement, or a multiple reaction monitoring (MRM) measurement in an MS/MS analysis, which provides higher selectivity.

In conventional quadrupole mass spectrometers, the waiting time from the point in time when a mass scan is terminated to the point in time when the next mass scan is started is constant regardless of the analysis conditions, such as the mass range specified in a scan measurement. On the other hand, in the quadrupole mass spectrometer according to the first aspect of the present invention, the controller sets a shorter waiting time (or settling time) for a smaller difference between the scan initiation mass and the scan termination mass in a scan measurement.

If the difference between the scan initiation mass and the scan termination mass is small, the overshoot (undershoot), which occurs when the voltage applied to the electrodes composing the quadrupole mass filter is returned to the voltage corresponding to the scan initiation mass, is also relatively small. That is, the time required for the voltage to stabilize is short. Therefore, even though the waiting time is shortened, the subsequent mass scan can be started from the state where the voltage is sufficiently stable. This shortens the wasted waiting time which does not contribute to the collection of the mass analysis data, thereby shortening the cycle period of the mass scan in a scan measurement. This holds true not only for a scan measurement in which a predetermined mass range is exhaustively scanned, but also for an SIM measurement and an MRM measurement in which the number of masses set in a cycle is much smaller than in a scan measurement.

To solve the previously described problem, the second aspect of the present invention provides a quadrupole mass spectrometer which includes a quadrupole mass filter for selectively allowing an ion having a specific mass to pass through and a detector for detecting the ion which has passed through the quadrupole mass filter and which performs a scan measurement in which a cycle of scanning the mass of ions which pass through the quadrupole mass filter across a predetermined mass range is repeated, the quadrupole mass spectrometer including:

a) a quadrupole driver for applying a predetermined voltage to each of the electrodes composing the quadrupole mass filter; and b) a controller for, in performing the scan measurement, setting a scan margin at least either above or below a specified mass range and controlling the quadrupole driver in such a manner as to change the voltage applied to each of the electrodes composing the quadrupole mass filter so as to scan a mass range which is wider than the specified mass range by the scan margin, and for changing the mass width of the scan margin in accordance with the scan rate.

In conventional quadrupole mass spectrometers, similar to the aforementioned waiting time (settling time), the mass width of the scan margin (which will be hereinafter called the "scan margin width") is constant regardless of the conditions such as the scan rate. On the other hand, in the quadrupole mass spectrometer according to the second aspect of the present invention, the controller sets a smaller scan margin when a lower (or slower) scan rate is specified. Lowering the scan rate results in a longer scan time for the same scan margin width. In other words, in the case where the scan rate is low, even though the scan margin width is small, it is possible to assure as much temporal margin as in the case where the scan rate is high and the scan margin width is large. During the period of this temporal margin, unnecessary ions remaining inside the quadrupole mass filter are eliminated, after which the first target ion is allowed to pass through the quadrupole mass filter.

As just described, in conventional apparatuses, an excessive temporal margin is taken even in the case where the scan rate is low, whereas in the quadrupole mass spectrometer according to the second aspect of the present invention, such an excessive temporal margin is reduced to shorten the cycle period of a mass scan.

In addition, even for the same scan rate, as the mass scan range moves to the higher mass region, the necessary scan margin width becomes larger. This is because ions having a larger mass fly slower inside the quadrupole mass filter, and it takes longer for the first target ion to be ejected from the quadrupole mass filter after it is injected thereinto. Therefore, in the quadrupole mass spectrometer according to the second aspect of the present invention, it is preferable that the controller changes the mass width of the scan margin further in accordance with the scan initiation mass. In particular, a smaller mass width of the scan margin can be set for a smaller scan initiation mass.

The time required for an ion to pass through the quadrupole mass filter also depends on the kinetic energy that the ion has at the point in time when it is injected into the quadrupole mass filter. The larger the kinetic energy is, the faster the ion can pass through. Given this factor, it is preferable that the controller further changes the mass width of the scan margin in accordance with the acceleration voltage for an ion or ions injected into the quadrupole mass filter. In particular, a smaller mass width of the scan margin can be set for a higher acceleration voltage.

In the configuration where an ion transport optical system, such as an ion lens, for transporting an ion is provided in the previous stage of the quadrupole mass filter, the acceleration voltage corresponds to the direct-current potential difference between the ion transport optical system and the quadrupole mass filter. Hence, when the direct-current bias voltage applied to the ion transport optical system is constant, the mass width of the scan margin may be changed in accordance with the direct-current bias voltage (which is different from the voltage for mass selection of an ion) applied to the quadrupole mass filter.

Effects of the Invention

In the quadrupole mass spectrometer according to the first aspect of the present invention, an excessive and useless waiting time that arises when the voltage applied to the quadrupole mass filter is changed among the adjacent cycles in a scan measurement, an SIM measurement, or an MRM measurement can be shortened. Therefore, for example, the cycle period of a mass scan can be shortened even for the same scan rate. This shortens what is called the dead time, i.e. a period of time when no mass analysis data can be obtained, thereby increasing the temporal resolution.

In the quadrupole mass spectrometer according to the second aspect of the present invention, the mass width of the scan margin for stabilizing a measurement which is set outside the mass range in a scan measurement can be decreased. Therefore, in the case where, for example, the scan rate is low or the mass range is located in a relatively low region, the cycle period of the mass scan can be shortened. This shortens what is called the dead time, i.e. a period of time when no mass analysis data can be obtained, thereby increasing the temporal resolution.

EXPLANATION OF NUMERALS

1 . . . Ion Source
2 . . . Ion Transport Optical System
3 . . . Quadrupole Mass Filter
3*a*, 3*b*, 3*e*, 3*d*. . . Rod Electrode
4 . . . Detector
10 . . . Controller
101 . . . Settling Time Determiner
102 . . . Scan Margin Width Determiner
11 . . . Input Unit
12 . . . Voltage Control Data Memory
13 . . . Ion Selection Voltage Generator
15 . . . Radio-Frequency Voltage Generator
16 . . . Direct-Current Voltage Generator
17 . . . Radio-Frequency/Direct-Current Adder
18 . . . Bias Voltage Generator
19, 20 . . . Bias Adder
21 . . . Ion Optical System Voltage Generator

BEST MODE FOR CARRYING OUT THE INVENTION

Figure 1:
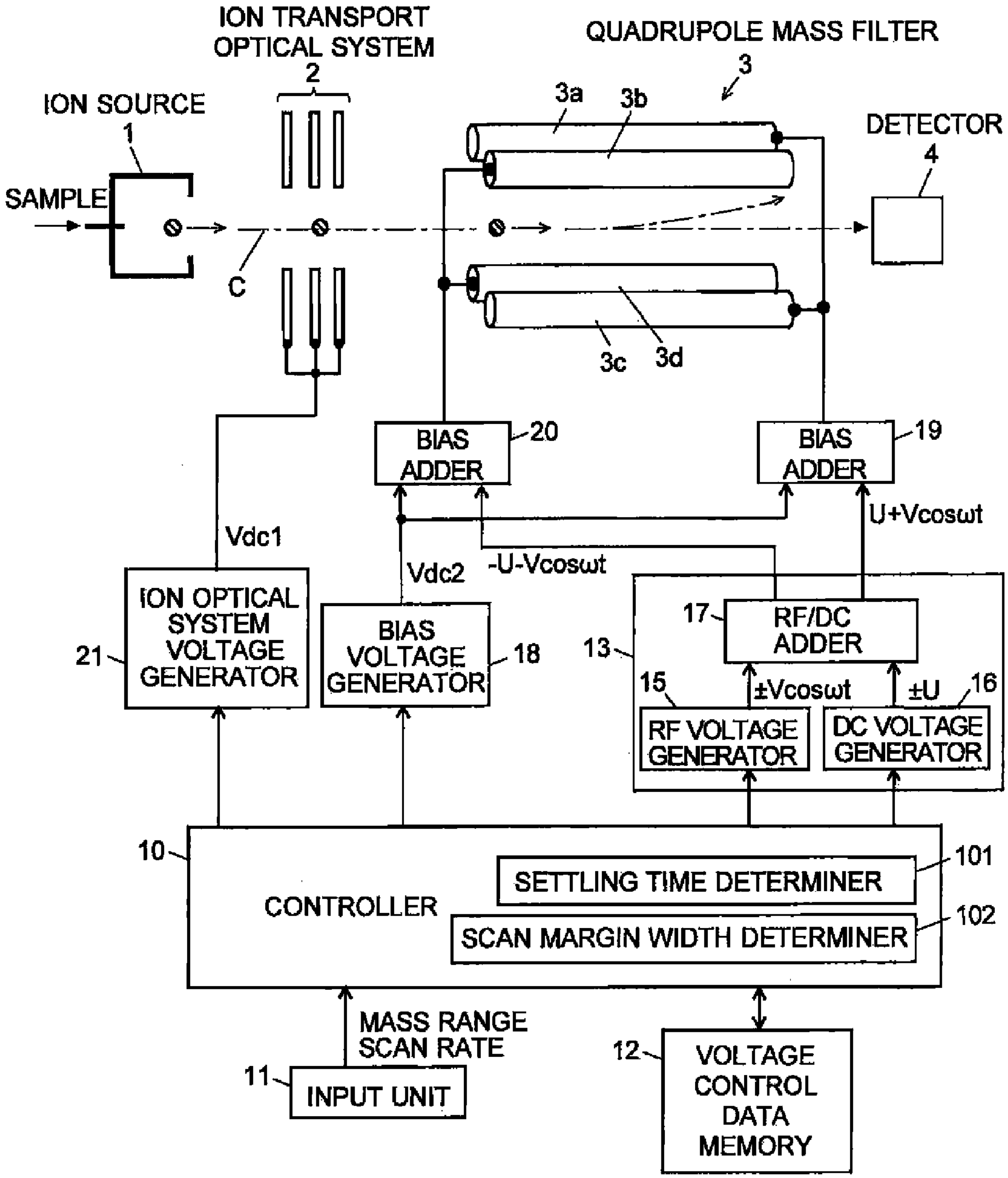
FIG. 1 is a configuration diagram of the main portion of a quadrupole mass spectrometer of an embodiment of the present invention.
Figure 6:
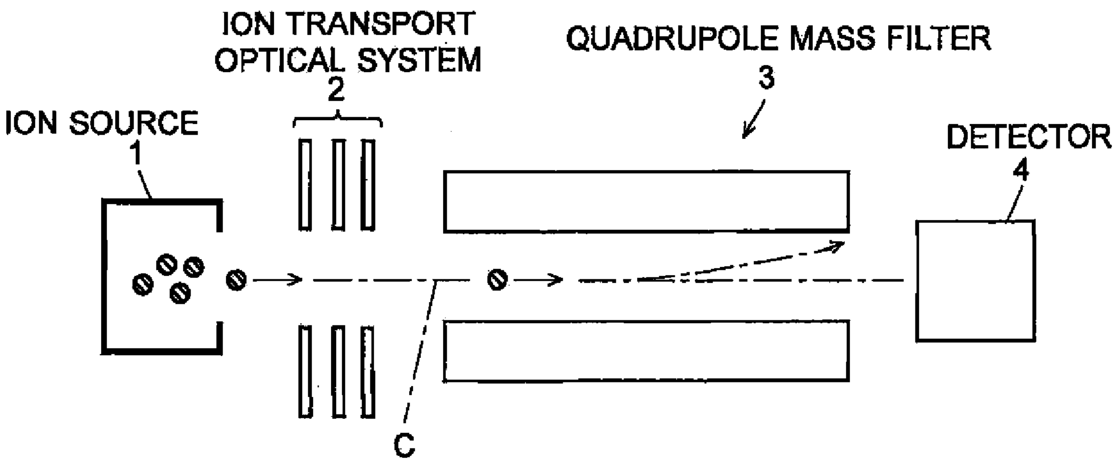
FIG. 6 is a schematic configuration diagram mainly illustrating an ion optical system of a general quadrupole mass spectrometer.
Figure 7:
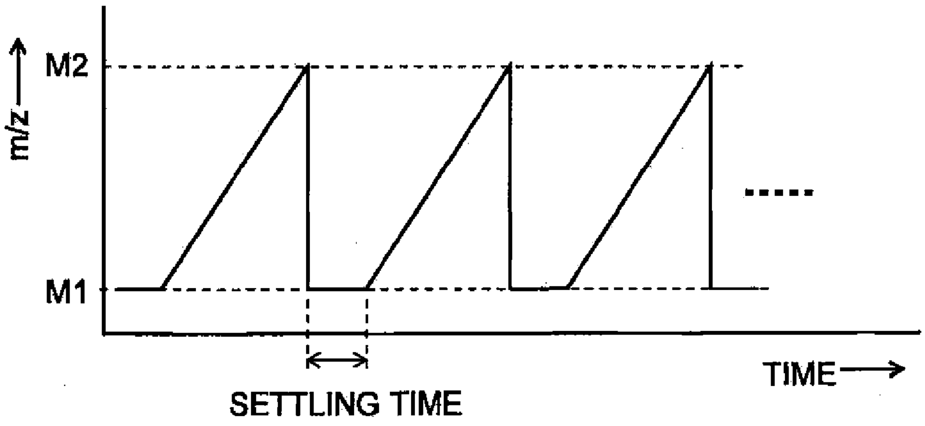
FIG. 7 schematically shows how the mass changes in a scan measurement.

A quadrupole mass spectrometer of an embodiment of the present invention will be described with reference to the attached figures. FIG. 1 is a configuration diagram of the main portion of the quadrupole mass spectrometer according to this embodiment. The same components as in FIG. 6 which have been already described are indicated with the same numerals. In the quadrupole mass spectrometer according to this embodiment, a gaseous sample is injected into the ion source 1, and a gas chromatograph can be connected in the previous stage of the mass spectrometer. A liquid sample may also be analyzed by using an atmospheric pressure ion source (such as an electrospray ion source) as the ion source 1, and maintaining this ion source 1 at an atmosphere of approximate atmospheric pressure while placing the quadrupole mass filter 3 and the detector 4 in a high vacuum atmosphere by a multistage differential pumping system. In such a case, a liquid chromatograph can be connected in the previous stage of the mass spectrometer.

In the quadrupole mass spectrometer of the present embodiment, inside the vacuum chamber (which is not shown) are provided the ion source 1, the ion transport optical system 2, the quadrupole mass filter 3, and the detector 4, as previously described. The quadrupole mass filter 3 has four rod electrodes 3*a*, 3*b*, 3*c*, and 3*d* provided in such a manner as to internally touch a cylinder having a predetermined radius centering on the ion optical axis C. In these four rod electrodes 3*a*, 3*b*, 3*c*, and 3*d*, two rod electrodes facing across the ion optical axis C, i.e. the rod electrodes 3*a* and 3*c* as well as the rod electrodes 3*b* and 3*d*, are connected to each other. The quadrupole driver as a means for applying voltages to these four rod electrodes 3*a*, 3*b*, 3*c*, and 3*d* is composed of the ion selection voltage generator 13, the bias voltage generator 18, and the bias adders 19 and 20. The ion selection voltage generator 13 includes a direct-current (DC) voltage generator 16, a radio-frequency (RF) voltage generator 15, and a radio-frequency/direct-current (RF/DC) adder 17.

The ion optical system voltage generator 21 applies a direct-current voltage Vdc1 to the ion transport optical system 2 in the previous stage of the quadrupole mass filter 3. The controller 10 is for controlling the operations of the ion optical system voltage generator 21, the ion selection voltage generator 13, the bias voltage generator 18, and other units. The voltage control data memory 12 is connected to the controller 10 in order to perform this operation. An input unit 11 which is operated by an operator is also connected to the controller 10. The function of the controller 10 is realized mainly by a computer including a central processing unit (CPU), a memory, and other units.

In the ion selection voltage generator 13, the direct-current voltage generator 16 generates direct-current voltages ±U having a polarity different from each other under the control by the controller 10. The radio-frequency voltage generator 15 generates, similarly under the control of the controller 10, radio-frequency voltages ±V·cos ωt having a phase difference of 180 degrees. The radio-frequency/direct-current adder 17 adds the direct-current voltages ±U and the radio-frequency voltages ±V·cos ωt to generate two types of voltages of U+V·cos ωt and −(U+V·cos ωt). These are ion selection voltages which determine the mass (or m/z to be exact) of the ions which pass through.

In order to form, in front of the quadrupole mass filter 3, a direct-current electric field in which ions are efficiently injected into the longitudinal space of the quadrupole mass filter 3, the bias voltage generator 18 generates a common direct-current bias voltage Vdc2 to be applied to each of the rod electrodes 3*a* through 3*d* so as to achieve an appropriate voltage difference from the direct-current voltage Vdc1 applied to the ion transport optical system 2. The bias adder 19 adds the ion selection voltage U+V·cos ωt and the direct-current bias voltage Vdc2, and applies the voltage of Vdc2+U+V·cos ωt to the rod electrodes 3*a* and 3*c*. The bias adder 20 adds the ion selection voltage −(U+V·cos ωt) and the direct-current bias voltage Vdc2, and applies the voltage of Vdc2−(U+V·cos ωt) to the rod electrodes 3*b* and 3*d*. The values of the direct-current bias voltages Vdc1 and Vdc2 may be appropriately set based on an automated tuning performed by using a standard sample or other measures.

In the quadrupole mass spectrometer of the present embodiment, a scan measurement is performed, in which a mass scan across a mass range set by a user is repeated, by changing the voltage (to be more precise, the direct-current voltage U and the amplitude V of the radio-frequency voltage) applied to each of the rod electrodes 3a through 3d of the quadrupole mass filter 3. In the scan measurement, a characterizing voltage control is performed. Hereinafter, this control operation will be described.

Figure 2:
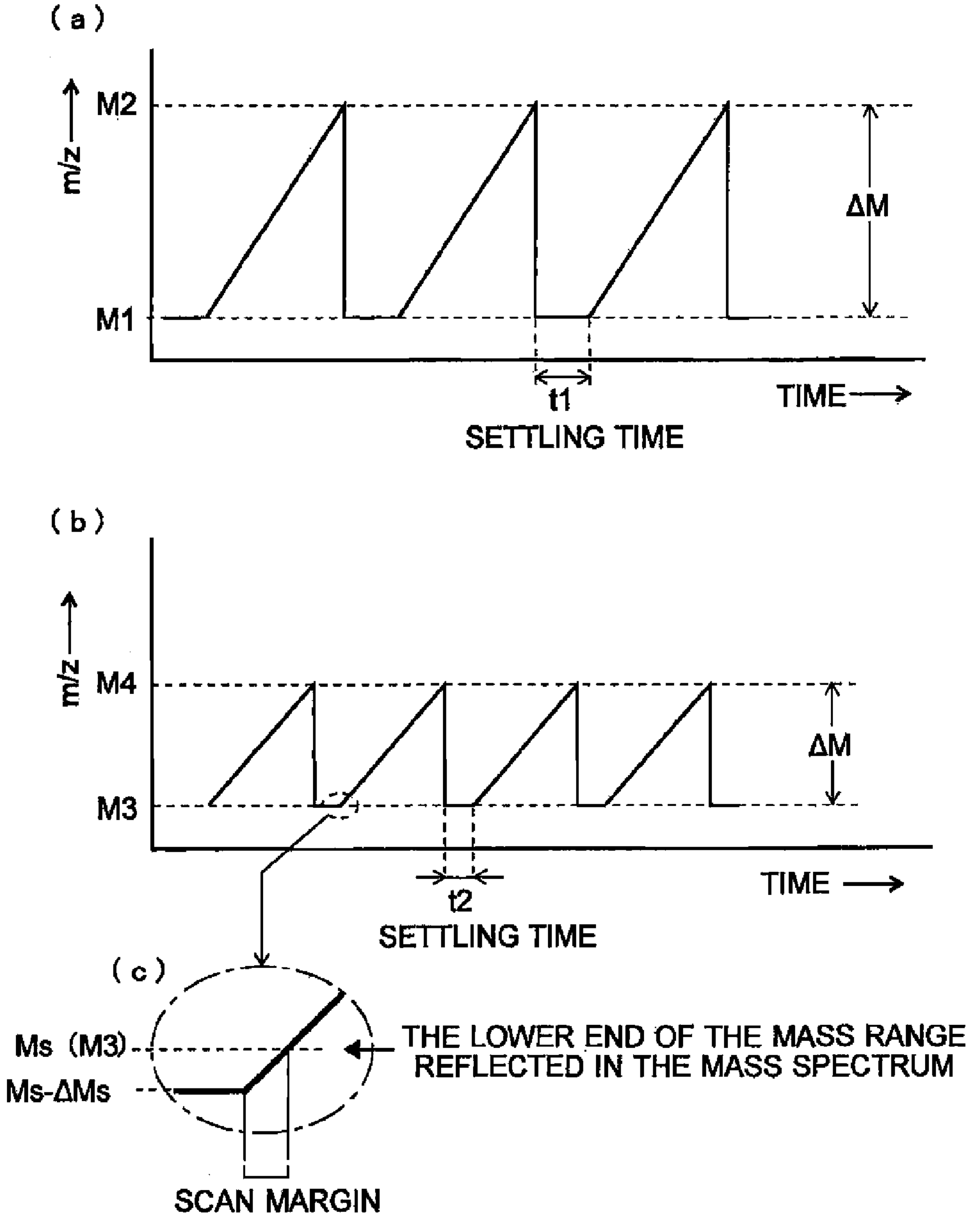
FIG. 2 shows how the mass changes in a scan measurement.

In the scan measurement, as shown in FIG. 2(a), the applied voltage is gradually increased from the voltage corresponding to the scan initiation mass M1. On reaching the voltage corresponding to the scan termination mass M2, the applied voltage is immediately returned to the voltage corresponding to the scan initiation mass M1. This is one mass scan, i.e. one cycle. The rapid decrease in the voltage causes an undershoot and a certain amount of time is required until the voltage value stabilizes. Therefore, the operation waits until the voltage stabilizes, and then a voltage scan for the next mass scan, i.e. the next cycle, is initiated. The larger the preceding change in the voltage is, i.e. the larger the voltage difference between the scan termination voltage and the scan initiation voltage is, the larger the amount of undershoot becomes. Hence, as the mass difference ΔM between the scan termination mass M2 and the scan initiation mass M1 becomes larger, the voltage requires a longer time stabilize (the voltage stabilization time).

Figure 3:
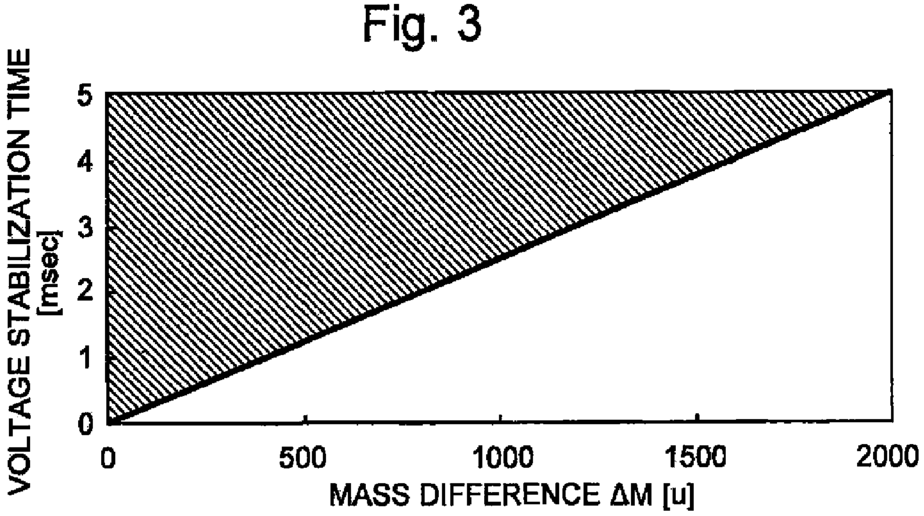
FIG. 3 is a diagram showing an actually measured relationship between the mass difference between the scan initiation mass and the scan termination mass, and the necessary voltage stabilization time in a scan measurement.

FIG. 3 is a graph of the result of an actual measurement of the relationship between the mass difference ΔM and the voltage stabilization time. This result shows that, for example, a voltage stabilization time of 0.5 [msec] is sufficient for a mass difference ΔM of 200 [u], while a voltage stabilization time of 5 [msec] is required for a mass difference ΔM of 2000 [u]. In conventional quadrupole mass spectrometers, independently of the mass difference ΔM, a constant settling time has been set to achieve the largest voltage stabilization time. Thus, for a settling time of 5 [msec] for example, a time period of 4.5 [msec] is wasted in the case where the mass difference ΔM is 200 [u]. The shaded triangular area in FIG. 3 corresponds to the wasted time period in conventional apparatuses. The "wasted time" used herein is the time when the process is waiting without initiating the next mass scan even though the voltage is already stable.

In the quadrupole mass spectrometer of the present embodiment, in order to decrease the aforementioned wasted time as much as possible, the length of the waiting time until the next mass scan is initiated (i.e. the settling time) is changed in accordance with the mass difference ΔM. For that purpose, the settling time determiner 101 included in the controller 10 holds a set of information prepared for deriving an appropriate settling time from the mass difference ΔM. This information includes, for example, a computational expression, table, or the like, which represents the line showing the relationship between the voltage stabilization time and the mass difference ΔM as illustrated in FIG. 3.

In performing a scan measurement, the user beforehand sets the analysis conditions including the mass range, the scan rate, and other parameters through the input unit 11. Then, the settling time determiner 101 in the controller 10 computes the mass difference ΔM from the specified mass range and obtains the settling time corresponding to the mass difference ΔM by using the aforementioned information for deriving the settling time. Thereby, a longer settling time is set for a larger mass difference ΔM. When repeating the mass scan across the specified mass range, the controller 10 sets the waiting time after one mass scan is terminated and before the next mass scan is initiated, to the settling time that has been determined by the settling time determiner 101. Consequently, as illustrated in FIG. 2(b), the settling time t2 becomes short for a small mass difference ΔM, which practically shortens the cycle of the mass scan. Although no mass analysis data are obtained during the settling time, the shortened settling times increase the temporal resolution.

In addition, in the quadrupole mass spectrometer of the present embodiment, not only the settling time, but also the scan margin width ΔMs in a mass scan is changed in accordance with the analysis conditions. The scan margin width ΔMs is, as shown in FIG. 2(c), the mass difference between the specified scan initiation mass Ms and the mass with which the mass scan is actually initiated. Ideally, this scan margin width ΔMs should be zero; however, in reality, a certain amount of scan margin width ΔMs is required so as to eliminate the influence of unnecessary ions remaining inside the quadrupole mass filter 3 before a mass scan is initiated. In this case, although the mass scan is initiated from the mass of Ms−ΔMs, the data obtained until the mass becomes Ms are discarded for the lack of reliability. Hence, the data for equal to or more than the mass of Ms are actually reflected in the mass spectrum. A scan margin is set not only for the range equal to or less than the scan initiation mass Ms, but also for the range equal to or more than the scan termination mass Me.

Figure 5:
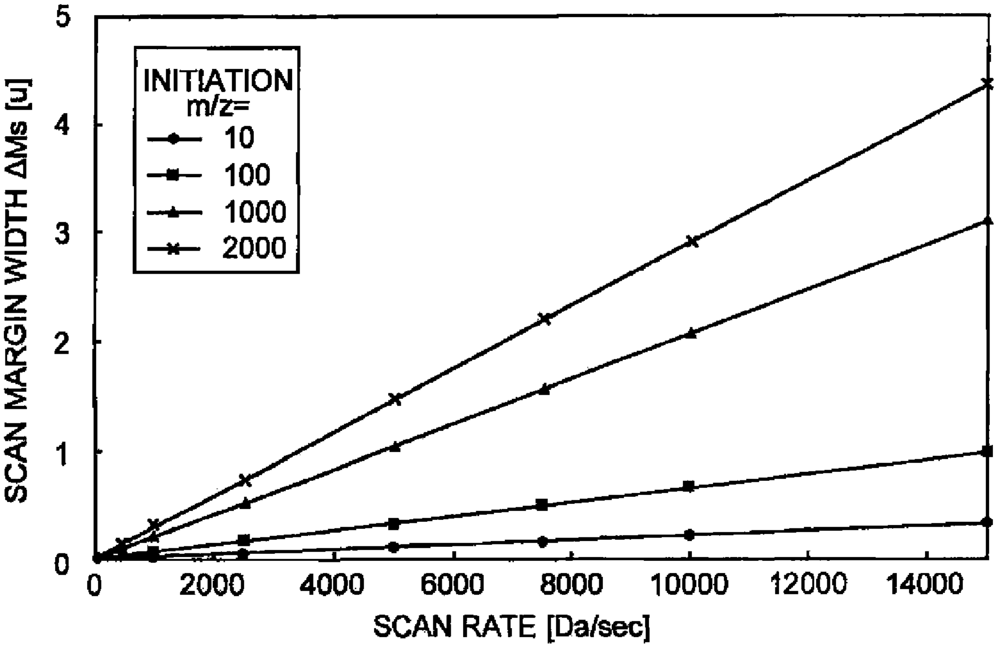
FIG. 5 is a diagram showing an actually measured relationship among the scan rate, the scan initiation mass, and the scan margin width.

FIG. 5 is a graph showing the result of an actual measurement of the relationship among the scan rate, the scan initiation mass, and the scan margin width ΔMs. In this measurement, with different scan rates being set, the change of the signal intensities was observed while the scan initiation mass and the scan margin width were each changed to examine the scan margins width with which a reliable signal intensity could be obtained. This shows that at a slow scan rate such as 1000 [Da/sec], the scan margin width ΔMs can be considerably decreased. Meanwhile, at a fast scan rate such as 15000 [Da/sec], it is necessary to set a large scan margin width ΔMs. This is because, the faster the scan rate is, the shorter the corresponding time becomes even with the same margin width ΔMs. In addition, if the scan initiation mass is large, the scan margin width ΔMs is required to be increased. This is because, the larger the mass of an ion is, the longer it takes for the ion to pass through the quadrupole mass filter 3. As an example, in the case where the scan rate is 15000 [Da/sec] and the scan initiation mass is 1048 [u], a scan margin width ΔMs of 3 [u] is required. That is, even though the lower end mass of the mass spectrum is m/z 1048, it is practically necessary to initiate the mass scan from m/z 1045.

FIG. 5 shows a result obtained under the condition that the ion acceleration voltage is constant, i.e. the voltage difference is constant between the direct-current bias voltage Vdc2 which is applied to the quadrupole mass filter 3 and the direct-current bias voltage Vdc1 which is applied to the ion transport optical system 2. Further, experiments demonstrate that the necessary scan margin width ΔMs also depends on the ion acceleration voltage. That is, the scan margin width ΔMs can be obtained by the following formula:

$$\Delta Ms = k \times [\text{scan rate}] \times [\text{m/z value}]^{1/2}$$

where k is a constant determined by the ion acceleration voltage. The larger the acceleration voltage is, the smaller the constant k becomes. Although the constant k is also dependent on the length of the rod electrodes 3a through 3d of the quadrupole mass filter 3, this length is not important because it is not an analysis condition set by a user.

In conventional quadrupole mass spectrometers, similar to the aforementioned settling time, the scan margin width ΔMs is also set to be a fixed value selected in the light of the worst case condition. Therefore, in the case where the scan rate is slow, where the scan initiation mass is small, or in other cases, the scan margin width is too large, and some of this time period for scanning this mass range falls under the aforementioned "wasted time." On the other hand, in the quadrupole mass spectrometer of the present embodiment, the scan margin width ΔMs is changed in accordance with the scan rate, the scan initiation mass, and the ion acceleration voltage. For this purpose, the scan margin width determiner 102 included in the controller 10 holds a set of information prepared for deriving an appropriate scan margin width ΔMs from the scan rate, the scan initiation mass, and the ion acceleration voltage. This information includes, for example, a computational expression, table, or the like, which represents the line showing the relationship among the scan rate, the scan initiation mass, and the scan margin width as illustrated in FIG. 5. In addition, different computational expressions and tables are prepared for each bias direct-current voltage which determines the ion acceleration voltage.

In performing a scan measurement, when the user sets the analysis conditions including the mass range, the scan rate, and other parameters, then, by using the information for deriving the aforementioned scan margin width, the scan margin width determiner 102 in the controller 10 obtains a scan margin width ΔMs that corresponds to the specified scan rate, the specified scan initiation mass, and the acceleration voltage which is determined by the bias direct-current voltages Vdc1 and Vdc2. The bias direct-current voltages Vdc1 and Vdc2 do not depend on the analysis conditions set by the user but are normally determined as a result of a tuning automatically performed so as to maximize the ion intensity.

Consequently, for a higher scan rate and for a larger scan initiation mass, a longer scan margin width is set. In repeating the mass scan across the specified mass range, e.g. from M3 to M4, the controller 10 determines the actual mass scan range to be M1−ΔMs through M4+ΔMs, based on the scan margin width ΔMs determined by the scan margin width determiner 102, In the case where the scan rate is low (slow) or in the case where the scan initiation mass is small, the scan margin width becomes relatively small. Therefore, the cycle period of the mass scan practically becomes short. Although no valid mass analysis data are obtained during the period of this scan margin width, the shortened scan margin widths increase the temporal solution.

Figure 4:
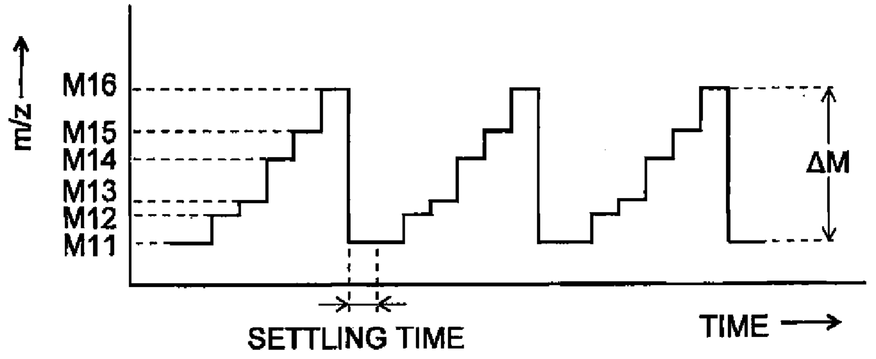
FIG. 4 shows how the mass changes in an SIM measurement.

The aforementioned description was for the case of performing a scan measurement. However, it is a matter of course that changing the length of the settling time in accordance with the mass difference ΔM is effective as previously described also in the case of repeatedly performing an SIM measurement in which mass analyses for previously specified plural masses are sequentially performed as shown in FIG. 4 or in the case of repeatedly performing an MRM measurement in an MS/MS analysis.

In the aforementioned embodiment, it is assumed that a scan is performed from lower to higher masses. Although this is a general operation, a scan can be reversely performed from higher to lower masses. Also in this case, the aforementioned technique can be used without change.

It should be noted that the embodiment described thus far is merely an example of the present invention, and it is evident that any modification, addition, or adjustment made within the spirit of the present invention is also included in the scope of the claims of the present application.

The invention claimed is

1. A quadrupole mass spectrometer comprising:

a quadrupole mass filter for selectively allowing an ion having a specific mass to pass through;

a detector for detecting the ion which has passed through the quadrupole mass filter, wherein the quadrupole mass spectrometer performs a scan measurement in which a cycle of scanning a mass of ions which pass through the quadrupole mass filter across a predetermined mass range is repeated or a measurement in which a cycle of sequentially setting a plurality of masses is repeated;

a quadrupole driver for applying a predetermined voltage to each of electrodes composing the quadrupole mass filter; and a controller for controlling the quadrupole driver in such a manner as to change the voltage applied to each of the electrodes composing the quadrupole mass filter in accordance with a mass during the scan measurement or the measurement in which a cycle of sequentially setting a plurality of masses is repeated, while changing a waiting time from a termination of one cycle to an initiation of a subsequent cycle in accordance with a mass difference between an initiation mass and a termination mass in a cycle.

2. The quadrupole mass spectrometer according to claim 1, wherein the controller shortens the waiting time as the difference between the scan initiation mass and the scan termination mass becomes smaller.

3. The quadrupole mass spectrometer according to claim 1, wherein, in performing the scan measurement, the controller sets a scan margin at least either above or below a specified mass range, controls the quadrupole driver in such a manner as to change the voltage applied to each of the electrodes composing the quadrupole mass filter so as to scan a mass range which is wider than the specified mass range by the scan margin, and changes a mass width of the scan margin in accordance with a scan rate.

4. The quadrupole mass spectrometer according to claim 3, wherein the controller decreases the mass width of the scan margin as the scan rate decreases.

5. The quadrupole mass spectrometer according to claim 3, wherein the controller further changes the mass width of the scan margin in accordance with a scan initiation mass.

6. The quadrupole mass spectrometer according to claim 4, wherein the controller further changes the mass width of the scan margin in accordance with a scan initiation mass.

7. The quadrupole mass spectrometer according to claim 5, wherein the controller further changes the mass width of the scan margin in accordance with an acceleration voltage for an ion injected into the quadrupole mass filter.

8. The quadrupole mass spectrometer according to claim 6, wherein the controller further changes the mass width of the scan margin in accordance with an acceleration voltage for an ion injected into the quadrupole mass filter.

* * * * *